United States Patent
Nakatsuka et al.

(10) Patent No.: US 9,481,233 B2
(45) Date of Patent: Nov. 1, 2016

(54) SHEET WINDING APPARATUS

(71) Applicants: Kenichi Nakatsuka, Aichi (JP); Kenji Yamada, Aichi (JP); Makoto Oguri, Aichi (JP); Koichi Ogawa, Aichi (JP)

(72) Inventors: Kenichi Nakatsuka, Aichi (JP); Kenji Yamada, Aichi (JP); Makoto Oguri, Aichi (JP); Koichi Ogawa, Aichi (JP)

(73) Assignee: HAYASHI TELEMPU Co., Ltd., Nagoya-shi, Aichi (JP)

( * ) Notice: Subject to any disclaimer, the term of this patent is extended or adjusted under 35 U.S.C. 154(b) by 365 days.

(21) Appl. No.: 14/281,822

(22) Filed: May 19, 2014

(65) Prior Publication Data

US 2014/0284414 A1 Sep. 25, 2014

Related U.S. Application Data

(63) Continuation of application No. PCT/JP2012/081038, filed on Nov. 30, 2012.

(30) Foreign Application Priority Data

Dec. 9, 2011 (JP) .................................. 2011-270419

(51) Int. Cl.
  *B65H 75/48* (2006.01)
  *B60J 11/02* (2006.01)
  (Continued)

(52) U.S. Cl.
  CPC ............... *B60J 11/025* (2013.01); *B60J 1/205* (2013.01); *B60R 5/047* (2013.01); *B65H 75/30* (2013.01); *B65H 75/48* (2013.01); *B65H 75/486* (2013.01); *B65H 2601/521* (2013.01)

(58) Field of Classification Search
  CPC ...... B60J 1/2033; B60J 1/205; B60J 7/0015; B60J 7/068; B60J 11/025; B60R 5/04; B60R 5/047; B65H 75/30; B65H 75/48; B65H 75/486; B65H 2601/521; E06B 9/42; E06B 9/50; E06B 9/60; E06B 2009/808
  See application file for complete search history.

(56) References Cited

U.S. PATENT DOCUMENTS 6,749,142 B2 * 6/2004 Arisaka ................... B60R 5/047
  160/296
6,923,398 B2 * 8/2005 Kosugi ..................... B60J 7/068
  160/296

(Continued)

FOREIGN PATENT DOCUMENTS

EP  2 514 618  * 10/2012
JP  H08-183394 A  7/1996

(Continued)

OTHER PUBLICATIONS

JP 2007-321891, Dec. 2007, Kanasako et al, machine english translation from J-PlatPat.*

(Continued)

*Primary Examiner* — William A Rivera
(74) *Attorney, Agent, or Firm* — Yokoi & Co., U.S.A.; Toshiyuki Yokoi (57) ABSTRACT

A sheet winding apparatus has a sheet, a winding axis to which one end of the sheet is fixed and having a cylindrical shape, a spring that is arranged in the winding axis and gives a biasing force to the winding axis in an opposite direction of drawing-out direction of the sheet, and a soundproof tube that is arranged between an outer periphery of the spring and inside the winding axis. The soundproof tube has first projected portions projecting outward from an outer periphery of the soundproof tube.

6 Claims, 8 Drawing Sheets

(51) Int. Cl.
B60R 5/04 (2006.01)
B65H 75/30 (2006.01)
B60J 1/20 (2006.01)

(56) References Cited

U.S. PATENT DOCUMENTS

| | | | |
|---|---|---|---|
| 2008/0073039 A1 | 3/2008 | Gyngell et al. | |
| 2011/0260484 A1* | 10/2011 | Takemura | B60R 5/047 296/24.43 |
| 2011/0266822 A1* | 11/2011 | Takemura | B60R 21/06 296/24.43 |
| 2012/0267465 A1* | 10/2012 | Kitani | B60J 7/0015 242/376 |
| 2014/0284414 A1* | 9/2014 | Nakatsuka | B60R 5/047 242/371 |

FOREIGN PATENT DOCUMENTS

| | | | |
|---|---|---|---|
| JP | H11-139211 A | | 5/1999 |
| JP | 2001-180382 A | | 7/2001 |
| JP | 2002-174085 A | | 6/2002 |
| JP | 2004-250225 A | | 9/2004 |
| JP | 2007-321891 | * | 12/2007 |
| JP | 2008-082158 A | | 4/2008 |
| JP | 2013-160774 | * | 8/2013 |

OTHER PUBLICATIONS

International Search Report for PCT/JP2012/081038 dated Mar. Feb. 22, 2013.
PCT written openion dated Mar. 12, 2013.
Japanese Notice of reason for cancellation dated Jun. 17, 2016.

* cited by examiner

Fig. 8

SHEET WINDING APPARATUS

CROSS-REFERENCES TO RELATED APPLICATIONS

This Application claims the benefit of priority and is a Continuation application of the prior International Patent Application No. PCT/JP2012/081038, with an international filing date of Nov. 30, 2012, which designated the United States, and is related to the Japanese Patent Application No. 2011-270419, filed Dec. 9, 2011, the entire disclosures of all applications are expressly incorporated by reference in their entirety herein.

BACKGROUND OF THE INVENTION

1. Field of the Invention

The present invention is related to a sheet winding apparatus capable of drawing out a sheet and storing the sheet.

2. Description of Related Art

A sheet winding apparatus capable of drawing out a sheet to cover a part of a vehicle compartment and a window and capable of winding the drawn out sheet is known. In an example of the sheet winding apparatus, the apparatus has a sheet, a winding axis having a cylindrical shape to fix one end of the sheet, a shaft stored in the winding axis, and a torsion spring stored between the winding axis and the shaft to be fixed to the winding axis at one end and fixed to the shaft at the other end. Therefore, if the sheet wound to the winding axis is drawn out, the torsion spring is twisted by the rotation of the winding axis and a winding force can be generated in an opposite direction of a drawing-out direction of the sheet.

In addition, in the sheet winding apparatus having a shaft, it sometimes happens that the shaft and the torsion spring are in contact with each other and an abnormal noise is generated when drawing out the sheet and winding the sheet. Therefore, Japanese Unexamined Patent Application Publication No. 2004-250225 discloses that a soundproof tube having a projecting line projected toward the torsion spring is interposed between the shaft and the torsion spring to reduce amplitude of vibration of the torsion spring by the projecting line and suppress the abnormal noise.

BRIEF SUMMARY OF THE INVENTION

A sheet winding apparatus without having a shaft has been developed for reducing weight, for reducing manufacturing cost, or any other reasons. However, if the shaft passing through the torsion spring is eliminated, the amplitude of vibration of the torsion spring increases and the winding axis and the torsion spring are in contact with each other causing the abnormal noise. On the other hand, the configuration of the sheet winding apparatus disclosed in Japanese Unexamined Patent Application Publication No. 2004-250225 is specialized for an apparatus having a shaft on the winding axis, and therefore it is difficult to apply the invention to a sheet winding apparatus without having the shaft. In addition, if the projecting line of the soundproof tube is projected toward the torsion spring, the projecting line may be interfered with the torsion spring when inserting the torsion spring into the soundproof tube. In such a case, insertability can be suppressed.

One aspect of the present invention has an aim for providing a sheet winging apparatus without having the shaft that pass through the torsion spring so as to suppress the abnormal noise generated when the winding axis and the spring stored in the winding axis are interfered with each other when drawing out of winding the sheet In addition, the present invention has an aim for improving working efficiency when assembling the sheet winding apparatus.

The present invention has a sheet, a winding axis to which one end of the sheet is fixed and having a cylindrical shape, a spring that gives a biasing force to the winding axis in an opposite direction of drawing-out direction of the sheet, and a soundproof tube that is located between an outer periphery of the spring and inside the winding axis and has first projected portions projecting outward from an outer periphery of the soundproof tube.

In the sheet winding apparatus configured above, when the sheet is drawn out of the winding axis, a torsional force is generated according to the rotation of the winding axis, and therefore a biasing force (winding force) is generated at the winding axis in an opposite direction of the drawing-out direction of the sheet. When the sheet is to be stored, the rotation direction of the winding axis, which is corresponding to the winding direction of the sheet, matches with the biasing direction of the spring, and therefore the winding axis is rotated by the spring and the sheet can be wound.

In addition, a soundproof tube is arranged between an outer periphery of the spring and an inner periphery of the winding axis. On the soundproof tube, first projected portions are formed on an outer periphery projecting outward. From the above configuration, amplitude force of the spring is absorbed by the soundproof tube or the projected portions by being elastically deformed either when the sheet is drawn out or when the sheet is wound, and therefore the abnormal noise is suppressed.

As for the shape of an inner periphery of the soundproof tube, the projected portions (projected portions other than the first projected portions) do not have to be formed but can be formed. If the projected portions other than the first projected portions are not formed at the inner periphery of the soundproof tube, there is nothing in the soundproof tube to interfere with the spring when inserting the spring into the soundproof tube, and therefore working efficiency is improved.

DETAILED DESCRIPTION OF THE INVENTION

An embodiment of the present invention will be described below. Note that the embodiment described below is only an example of the present invention. The present invention is not limited to the embodiment described below.

(1) Configuration of Tonneau Cover Device

Figure 1:
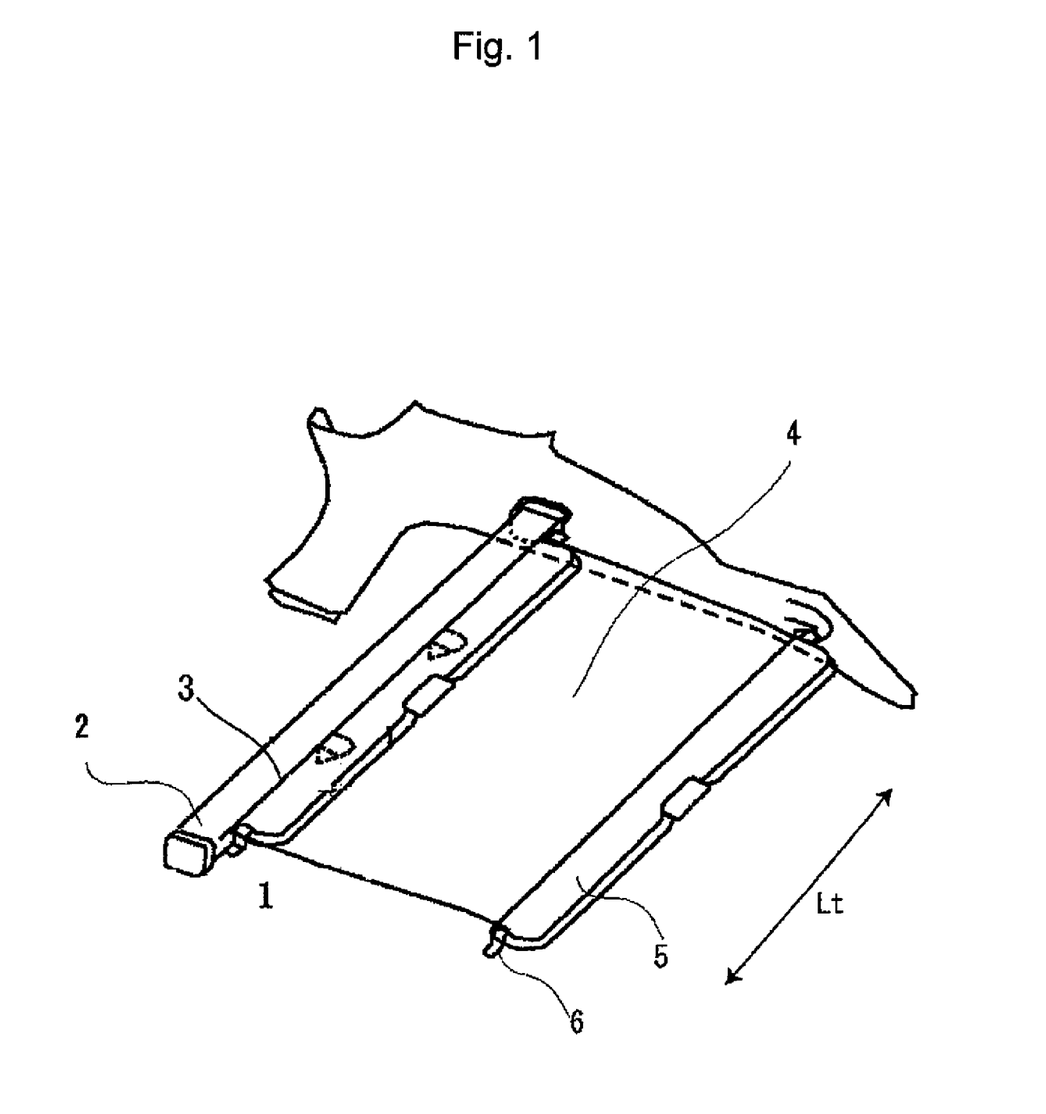
FIG. 1 is a perspective view showing a tonneau cover device mounted inside a vehicle compartment.
Figure 2:
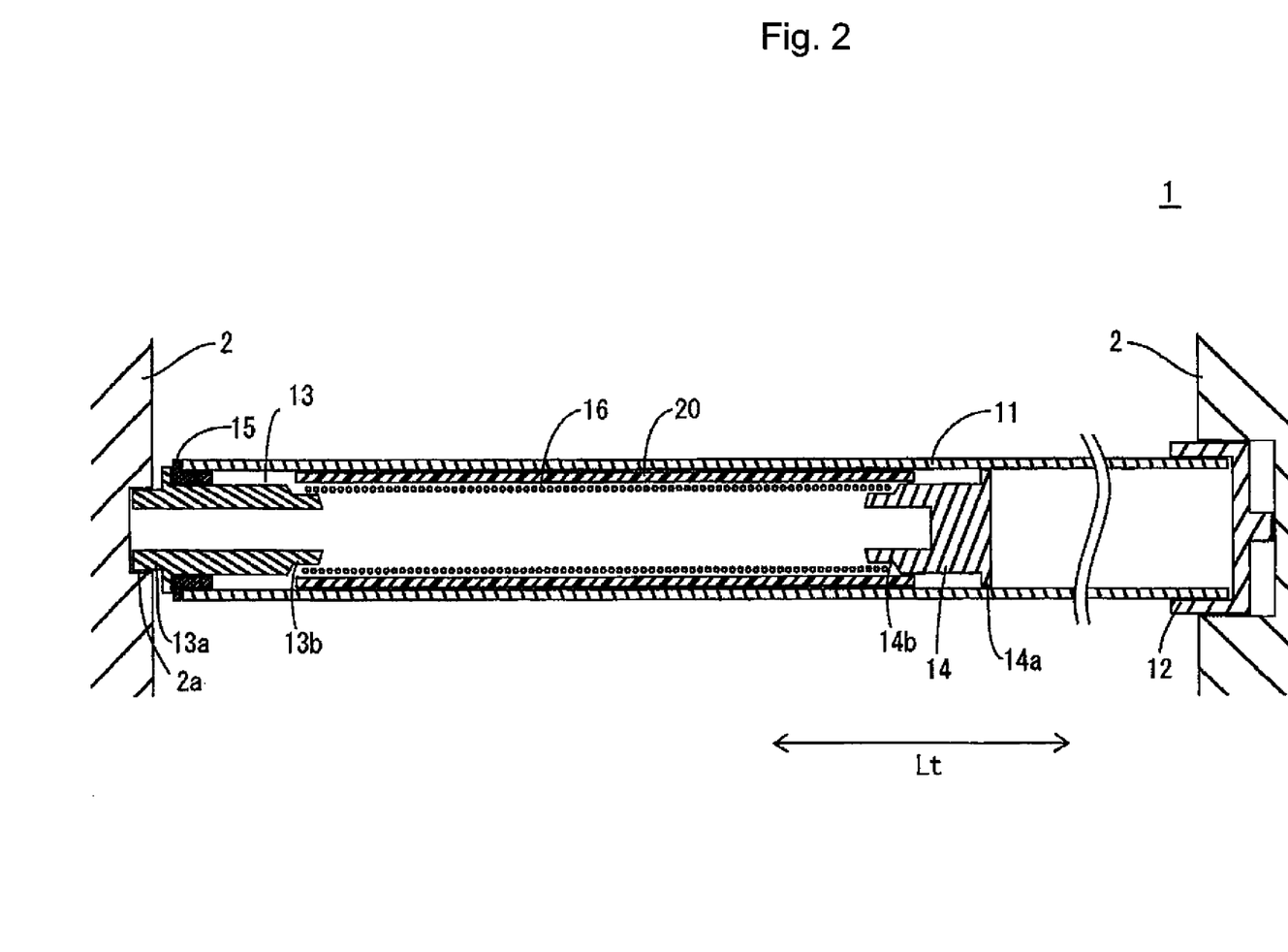
FIG. 2 is a cross-sectional view cut along a longitudinal direction showing a main portion of a tonneau cover device 1.
Figure 3:
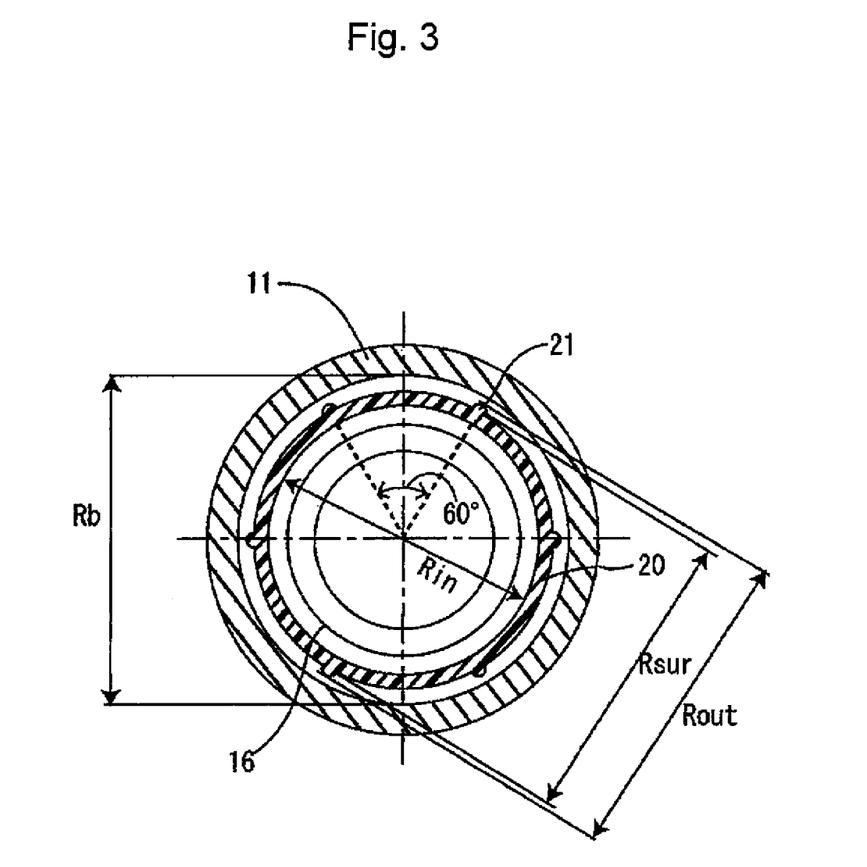
FIG. 3 is a cross-sectional view cut along a thickness direction showing a main portion of the tonneau cover device 1.

FIG. 1 is a perspective view showing a tonneau cover device mounted inside a vehicle compartment. FIG. 2 is a cross-sectional view cut along a longitudinal direction showing a main portion of a tonneau cover device 1. FIG. 3 is a cross-sectional view cut along a thickness direction showing a main portion of the tonneau cover device 1.

The tonneau cover device 1 shown in FIG. 1 is a device to cover a luggage room formed at a rear part of the vehicle compartment. The tonneau cover device 1 is fixed so that a longitudinal direction Lt is oriented in a width direction of the vehicle compartment. In addition, the tonneau cover device 1 has a sheet 4 which is capable of being drawn out from a slit 3 of a housing 2. The sheet 4 is drawn out from the housing 2 toward the rear part of the vehicle compartment. Further, a board material 5 is attached to a tip of the sheet 4. On the board material 5, an engaging hook 6 is attached to be engaged with an engaging portion formed on a side wall of the vehicle compartment. Therefore, the luggage room can be covered by drawing out the sheet 4 from the housing 2 and engaging the sheet 4 with the side wall of the vehicle compartment by the engaging hook 6. In addition, on the sheet 4 drawn out of the housing 2, a biasing force (winding force) is applied in an opposite direction of a drawing-out direction. Therefore, when the sheet is to be stored in the housing 2, the sheet can be wound by a barrel (described later) which is fixed to the housing 2 using the biasing force. Hereafter, a configuration of above described tonneau cover device 1 will be explained.

As shown in FIG. 2 and FIG. 3, in the tonneau cover device 1, a barrel (winding axis) 11 is fixed in the housing 2 so as to be rotatable in accordance with an operation of drawing out of the sheet 4. The barrel 11 has a cylindrical shape and one end of the sheet 4 is fixed on the outer peripheral side of the barrel 11. Consequently, the sheet 4 can be wound and the wound sheet can be drawn out in accordance with a rotation of the barrel 11. One end of the barrel 11 is fixed in the housing 2 so as to be rotatable via a rotation axis 12, and the other end is engaged with the housing 2 via a retaining portion 13. The barrel 11 is formed by extrusion molding aluminum in a tubular shape, for example. Retaining portions 13, 14 having a cylindrical shape are provided at one end of the barrel 11 and inside the barrel 11.

The retaining portion 13 has an engagement tooth 13a, which is larger in diameter than an inner diameter of the barrel 11, at one end side, and a taper portion 13b, which is smaller in diameter, at the other end. An end portion of the retaining portion 13 is inserted into the barrel 11 via a bearing 15 so as to be rotatable. On the other hand, the engagement tooth 13a of the retaining portion 13 is fixed by being engaged with a pawl portion 2a of the housing 2. Here, the retaining portions 13 and 14 are not limited to the one that is directly engaged with and fixed with the housing 2. For example, the retaining portions 13 and 14 can be engaged with and fixed with the housing 2 via a not illustrated holder member.

On the other hand, the retaining portion 14 has a flange 14a which is smaller in diameter than the inner diameter of the barrel 11, at one end, and a taper portion 14b, which is a smaller in diameter, at the other end. The retaining portion 14 is stored in the barrel 11 so that an end portion of the taper portion side of the retaining portion 14 is facing with an end portion of the taper portion side of the retaining portion 13. The retaining portion 14 is pressure bonded with the barrel 11 by caulking processing. Note that caulking processing to fix the retaining portion 14 with the barrel 11 is only an example. Any other structure can be used instead as long as the retaining portion 14 is restricted from being rotated in a radial direction. For example, by changing a hollow cross-sectional shape of the barrel 11, the retaining portion 14, which is stored in the barrel 11, can be restricted from being rotated.

Here, the retaining portions 13 and 14 are formed by injection molding a resin material, for example.

In the barrel 11, a torsion spring (hereafter, also referred to as spring) 16, which is engaged with the retaining portions 13 and 14, is stored. In the present embodiment, the spring 16 is composed of a helical spring having engaging hooks at both ends in an extending direction. Therefore, a hook formed at one end of the spring 16 is engaged with the taper portion side of the retaining portion 13, a hook formed at the other end is engaged with the taper portion side of the retaining portion 14, and the spring 16 is stored in the barrel 11. A length of the spring 16 is shorter than that of the barrel 11. The spring 16 is made of SWC material, for example.

Between an inner periphery of the barrel 11 and an outer periphery of the spring 16, a soundproof tube 20 made of thermoplastic resins such as styrene based elastomer (also referred to as TPS) and olefin based elastomer (also referred to as TPO) is stored. In the present embodiment, as shown in FIGS. 2 and 3, the spring 16 is stored in the soundproof tube 20 having a hollow tubular structure, and therefore the soundproof tube 20 is interposed between the inner periphery of the barrel 11 and the outer periphery of the spring 16. On an outer periphery of the soundproof tube 20, a plurality of projected portions (first projected portions) 21 are formed.

The projected portions 21 of the soundproof tube 20 have a cross-sectional shape of projecting with a short length to outside in the radial direction of the soundproof tube 20, for example. In FIG. 3, six projected portions 21 are formed at every 60 degrees with respect to a center of the soundproof tube 20, and the projected portions 21 are continuously formed in a linear shape along the longitudinal direction Lt. Of course, to form the projected portions 21 continuously in a linear shape is only an example. The number of the projected portions 21 is not limited to six. It is only an example.

A length of the soundproof tube 20 is preferably longer than a length of the spring 16 in the extending direction so that the outer periphery of the spring 16 is not exposed when the spring 16 is stored in the soundproof tube 20. An inner diameter Rin of the soundproof tube 20 is preferably larger than an outer diameter of the spring 16. If the inner diameter Rin of the soundproof tube 20 is larger than the outer diameter of the spring 16, insertability when the spring 16 is inserted into the soundproof tube 20 can be improved.

An outer diameter Rout of the soundproof tube 20 including the projected portions 21 can be larger than an inner diameter Rb of the barrel 11. However, an outer diameter Rsur of the soundproof tube 20 excluding the projected portions 21 is preferably smaller than the inner diameter Rb of the barrel 11. Namely, it is preferred that the relation of the following formula (1) is satisfied.

$$Rsur < Rb \qquad (1)$$

If the outer diameter Rsur of the soundproof tube 20 is specified to be smaller than the inner diameter Rb of the barrel 11, the soundproof tube 20 and the barrel 11 are prevented from being in surface contact with each other to increase the friction when inserting the soundproof tube 20 into the barrel 11. In addition, the soundproof tube 20 can be easily deformed and therefore insertability can be improved.

If a gap between the inner diameter Rb of the barrel 11 and the outer diameter Rout of the soundproof tube 20, which is indicated as Rb−Rout, is larger than a total thickness of the soundproof tube 20, which is indicated as Rout−Rin, the amplitude force of the spring 16 may not be fully absorbed by the soundproof tube 20 and therefore the abnormal noise may be generated. Therefore, as for the relation of the inner diameter Rb of the barrel 11, the outer diameter Rout of the soundproof tube 20 and the inner diameter Rin of the soundproof tube 20, the relation of the following formula (2) is preferably satisfied.

$$Rb-Rout \leq Rout-Rin \quad (2)$$

The soundproof tube 20 is formed by extrusion molding thermoplastic resins such as TPS and TPO. A hardness of the soundproof tube 20 is preferably between 60 and 80 (Shore A hardness). If the hardness of the soundproof tube 20 is 60 or more, the barrel 11 is prevented from being curled up and being caught when inserting the sounding tube 20 into the barrel 11. Consequently, insertability of the soundproof tube 20 can be improved. If the hardness of the soundproof tube 20 is 80 or less, the abnormal noise can be suppressed when the soundproof tube 20 is in contact with the spring 16 or the barrel 11. The projected portions 21 are integrally formed on the outer surface of the soundproof tube 20 in the present embodiment, but the structure is not limited to this.

(2) Assembling Method of Tonneau Cover Device

Assembling method of the tonneau cover device 1 configured as described above will be explained. At first, the taper portion 13b of the retaining portion 13 is engaged with the hook formed at one end of the spring 16 in a state that the bearing 15 is inserted through the retaining portion 13. Then, the spring 16 is stored in the soundproof tube 20. And then, the retaining portion 14 is engaged with the hook, which is not yet engaged with the retaining portion, of the spring 16.

Then, the retaining portion 14 and the soundproof tube 20 (spring 16) are stored in the barrel 11. At this time, because the projected portions 21 are formed on an outer periphery of the soundproof tube 20, the projected portions 21 may be in contact with the inner periphery of the barrel 11. However, interference between the projected portions 21 and the barrel 11 can be relieved if the soundproof tube 20 or the projected portions 21 is elastically deformed keeping a line contact. Consequently, the soundproof tube 20 (spring 16) can be easily inserted. In particular, the tonneau cover device 1 of the present embodiment does not have a shaft axis which functions as a guide when inserting the spring 16, the spring 16 can be easily inserted because the soundproof tube 20 is elastically deformed.

Then, one end of the sheet 4 is fixed to the barrel 11. Note that, on the end portion of the sheet 4 not fixed to the barrel 11, the board material 5 is already fixed. Then, the barrel 11 and the retaining portion 14 are calked by a calking machine to be press-bonded. The end portion, which is an end portion the retaining portion 13 is not inserted, of the barrel 11 is assembled with the rotation axis 12. Then, the rotation axis 12 is inserted into a recessed portion of the housing 2. The engagement tooth 13a of the retaining portion 13 is fixed by being engaged with the pawl portion 2a formed on the housing 2.

By the above configuration, when the sheet 4 is drawn out of the housing 2, the barrel 11 is rotated along the drawing-out direction of the sheet with the retaining portion 13 and the rotation axis 12 as an axis. At this time, because the spring 16 is fixed to the barrel 11 via the retaining portion 14 at one end and fixed to the housing 2 via the retaining portion 13 at the other end, a torsional force is generated at the spring 16 according to the rotation of the barrel 11. Consequently, a biasing force (winding force) is generated at the barrel 11 in an opposite direction of the drawing-out direction of the sheet.

On the other hand, when the sheet 4 is to be stored in the housing 2, because the rotation direction of the barrel 11, which is corresponding to the winding direction of the sheet 4, matches with the biasing direction of the spring 16, the barrel 11 is rotated by the spring 16 and therefore the sheet 4 can be wound.

The soundproof tube 20 having the projected portions 21 is always interposed between the outer periphery of the spring 16 and the inner periphery of the barrel 11, and therefore amplitude force of the spring 16 is absorbed by the soundproof tube 20 or the projected portions 21 by being elastically deformed when the sheet 4 is drawn out or wound. Consequently, the outer periphery of the spring 16 and the inner periphery of the barrel 11 are prevented from being in contact with each other and the abnormal noise can be suppressed.

Here, if the projected portions 21 are provided on the inner periphery side of the soundproof tube 20, the spring 16 and the projected portions 21 are interfered with each other and insertability is suppressed when inserting the spring 16 into the soundproof tube 20. However, in the present invention, the projected portions 21 of the soundproof tube 20 are projected outside from the outer periphery, and therefore the spring 16 and the projected portions 21 are not interfered with each other when inserting the spring 16 into the soundproof tube 20. Consequently, insertability of the spring 16 is not suppressed and assembling operation can be easily performed. On the other hand, if the barrel 11 into which the soundproof tube 20 (spring 16) is inserted has a predetermined hardness, the projected portions 21 may be in contact with the inner periphery of the barrel 11. However, friction generated by the insertion can be reduced because the soundproof tube 20 or the projected portions 21 are elastically deformed keeping a line contact. In addition, the projected portions 21 of the soundproof tube 20 are not projected toward the spring 16, and therefore it never happens that the spring 16 is accidentally engaged with the projected portions 21 and the sheet 4 is wrongly wound.

(3) Second Embodiment

Figure 4:
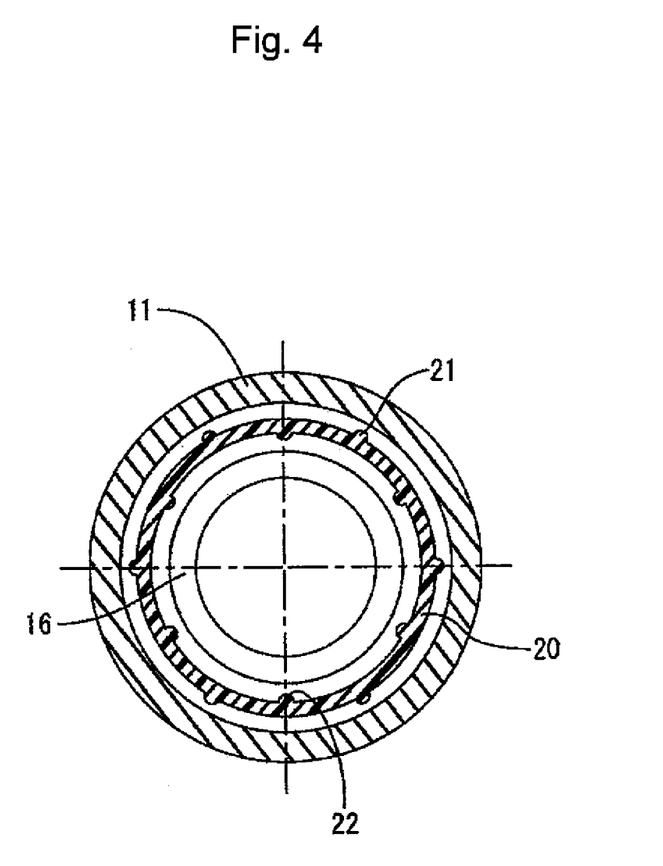
FIG. 4 is a cross-sectional view cut along a thickness direction showing a main portion of a tonneau cover device concerning the second embodiment.

FIG. 4 is a cross-sectional view cut along a thickness direction of a tonneau cover device 1 concerning the second embodiment. The tonneau cover device 1 of the second embodiment is different from the first embodiment in that projected portions of the soundproof tube 20 are projected also from an inner periphery in addition to the outer periphery.

As shown in FIG. 4, in addition to six projected portions (first projected portions) 21 projecting outward from the outer periphery, the soundproof tube 20 has six projected portions (third projected portions) 22 projecting inward from the inner periphery. The projected portions 21 and the projected portions 22 are formed shifting in position so that the projected portions projecting outward and the projected portions projecting inwards are not projected from a same position. In other words, in the soundproof tube 20, the projected portions 22 are not formed on the inner periphery facing the projected portions 21, and the projected portions 21 are not formed on the outer periphery facing the projected portions 22.

In the above described configuration, in addition to the effect of the first embodiment, the following effects can be achieved. If the projected portions 22 are provided on the inner periphery of the soundproof tube 20, the projected portions 22 may interfere with the spring 16 when inserting the spring 16. However, if the projected portions 21 and 22 are formed so that the projected portions projecting outward and the projected portions projecting inwards are not projected from a same position, a deformation amount of the soundproof tube 20 can be secured. Consequently, even when the projected portions 22 are in contact with the spring 16, the soundproof tube 20 is deformed and insertability is not suppressed. Further, if the deformation amount of the soundproof tube 20 is secured, the spring 16 is prevented from being accidentally engaged with the projected portions 22 and the sheet 4 is prevented from being wrongly wound.

(4) Third Embodiment

Figure 5A:
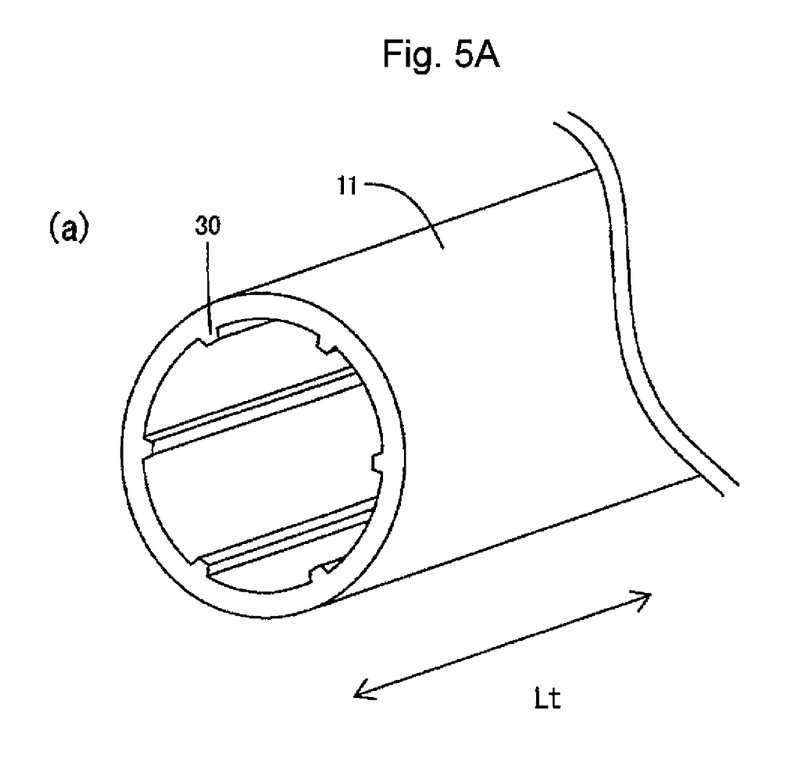
FIGS. 5A and 5B are drawings to explain a shape of a barrel 11 concerning the third embodiment.
Figure 5B:
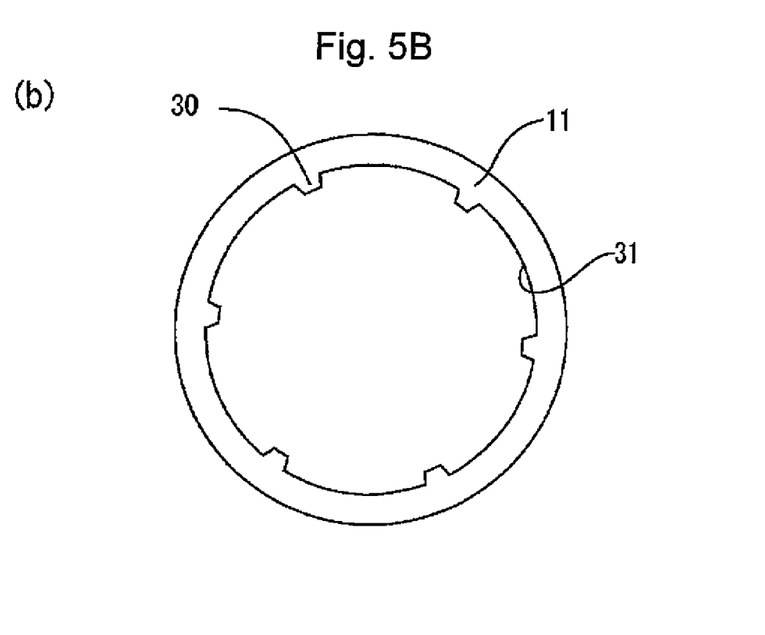
Figure 6A:
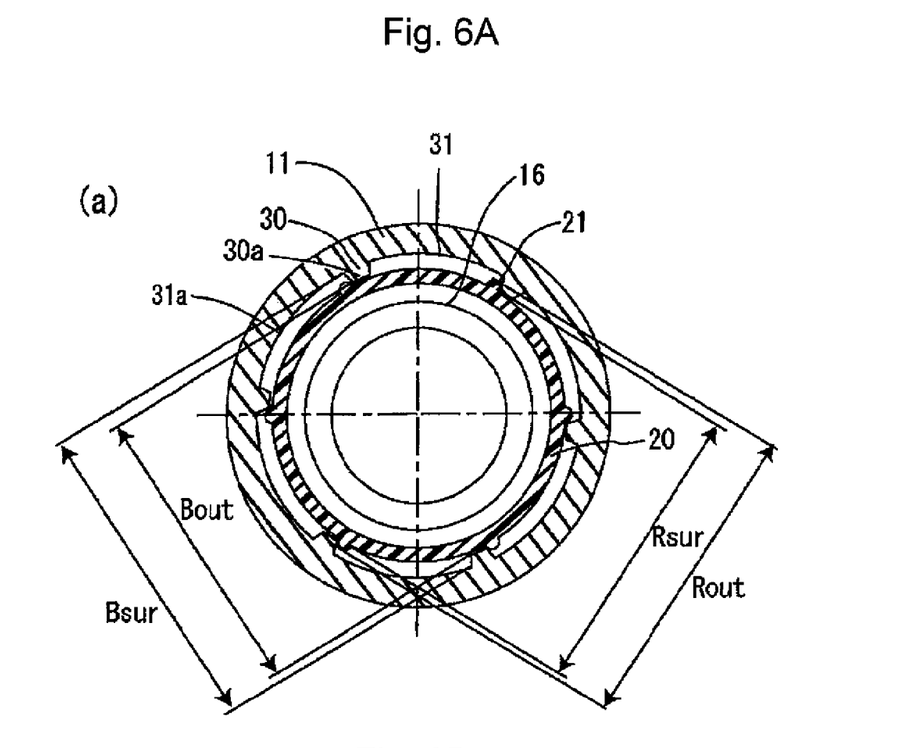
FIGS. 6A and 6B are transverse cross-sectional views showing a spring 16 and a soundproof tube 20 stored inside the barrel 11.
Figure 6B:
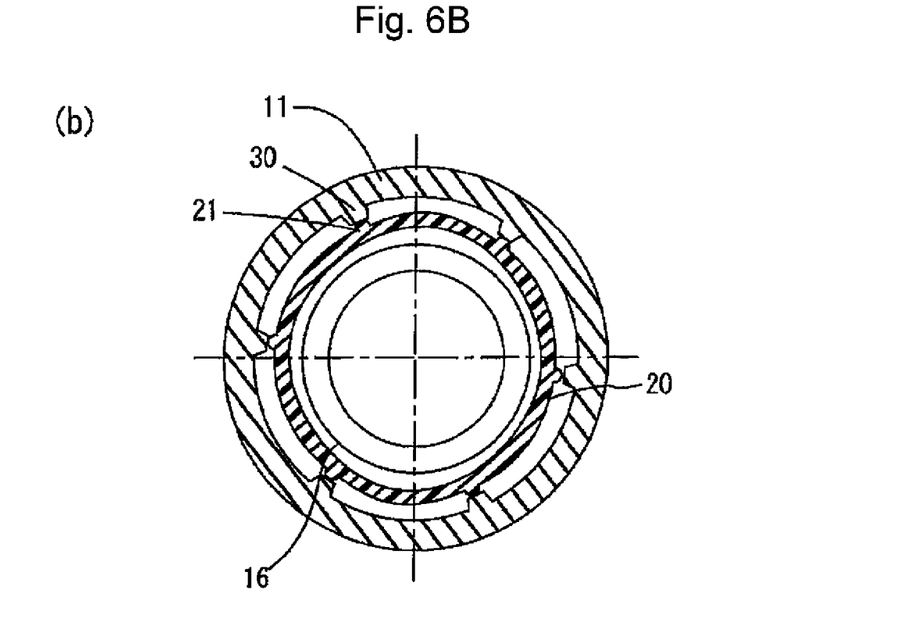
Figure 7:
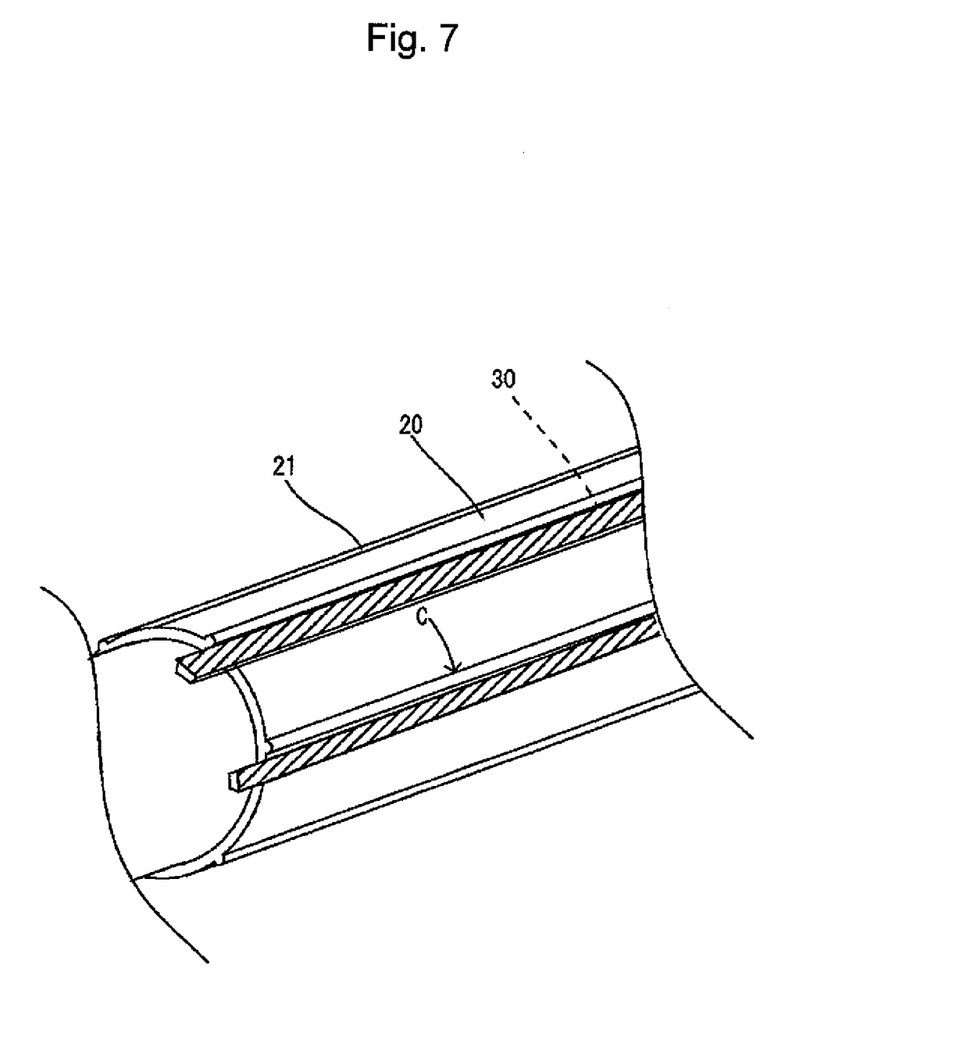
FIG. 7 is a perspective view showing the soundproof tube 20 stored inside the barrel 11.

FIG. 5 is a drawing to explain a shape of the barrel 11 concerning the third embodiment. FIG. 6 is a transverse cross-sectional view showing a spring 16 and a soundproof tube 20 stored inside the barrel 11. FIG. 7 is a perspective view showing the soundproof tube 20 stored inside the barrel 11.

In the third embodiment, same as the other embodiments, a tonneau cover device 1 has a barrel 11, a rotation axis 12, retaining portions 13, 14, a spring 16, and a soundproof tube 20. As for an arrangement of each part, explanation will be omitted because it is same as the other embodiments. On the other hand, as shown in FIGS. 5 to 7, projected portions (second projected portions) 30 are formed on an inner periphery of the barrel 11 projecting inward. The retaining portion 14 is not pressure bonded with the barrel 11, and is retained in the barrel 11 so as to be slidable along an axial direction.

FIG. 5A is a perspective view showing the barrel 11. FIG. 5B is a side view showing the barrel 11. As shown in FIGS. 5A and 5B, on the inner periphery of the barrel 11, the projected portions 30 are formed projecting inward from the inner periphery. The projected portions 30 are continuously formed in a longitudinal direction Lt of the barrel 11. A part of the inner periphery of the barrel 11 on which the projected portions 30 are not formed and side walls of the projected portions 30 function as a groove portion 31 (hereafter, the corresponding position of the barrel 11 will be merely referred to as groove portion 31).

If the barrel 11 is formed of metals such as aluminum, the projected portions 31 are integrally formed with the barrel 11 using an extrusion molding. Alternatively, the projected portions 30 can be formed by pressing the barrel 11. In such a case, it is not necessary to form the projected portions 30 continuously in the axial direction of the barrel 11. The projected portions 30 can be formed intermittently in the axial direction.

The number of the projected portions 30 is preferably same as the number of the projected portions 21 of the soundproof tube 20. However, the number of the projected portions 30 is not limited to this number. As long as the movement of the soundproof tube 20 is restricted, the number of the projected portions 21 can be one.

As shown in FIGS. 6 and 7, the soundproof tube 20 has projected portions 21 on outer periphery projecting outward. The projected portions 21 are provided on a longitudinal direction of the soundproof tube 20. As shown in FIG. 6, at least one of the projected portions 21 of the soundproof tube 20 is in touch with the projected portions 30 of the barrel 11, and the soundproof tube 20 is stored in the barrel 11. The projected portions 30 of the barrel 11 and the projected portions 21 of the soundproof tube 20 can be in contact with each other at side portions as shown in FIG. 6A, or near tip portions as shown in FIG. 6B. The contact between the projected portions 30 and the projected portions 21 can be achieved by combining FIGS. 6A and 6B.

Same as the other embodiments, the soundproof tube 20 is formed by extrusion molding thermoplastic resins such as TPS and TPO. Also in this embodiment, a hardness of the soundproof tube 20 is preferably between 60 and 80 (Shore A hardness). Note that the soundproof tube 20 can have projected portions 22 formed on inner periphery projecting inward as shown in the second embodiment.

The soundproof tube 20 and the barrel 11 preferably have following relation. As shown in FIG. 6A, in the inner diameter of the barrel 11, an inner diameter including a tip of the projected portions 30 is defined as Bout, and an inner diameter of the barrel 11 not including the projected portions 30 is defined as Bsur. Here, the inner diameter including a tip of the projected portions 30 is a diameter of a circular trace line defined by connecting tips 30a of the projected portions 30. The inner diameter of the barrel 11 not including the projected portions 30 is a diameter of a circular trace line defined by connecting a point of bottom surfaces 31a of the groove portions 31 of the barrel 11. When an outer diameter including a tip of the projected portions 31 of the soundproof tube 20 is defined as Rout and an outer diameter of the soundproof tube 20 not including the projected portions 21 is defined as Rsur, the relation of the following formula (3) is preferably satisfied.

$$Rout \leq Bsur, Rsur \leq Bout, Bout < Rout \quad (3)$$

Next, the assembling method of the tonneau cover device 1 concerning the third embodiment will be explained.

Same as the first and second embodiments, the taper portion 13b of the retaining portion 13 is engaged with the hook formed on one end of the spring 16 in a state that the bearing 15 is inserted through the retaining portion 13. Then, the spring 16 is stored in the soundproof tube 20. And then, the retaining portion 14 is engaged with the hook, which is not yet engaged with the retaining portion, of the spring 16.

Then, the retaining portion 14 and the soundproof tube 20 (spring 16) are stored in the barrel 11. At this time, the soundproof tube 20 is stored in the barrel 11 so that the projected portions 21 of the soundproof tube 20 are inserted into the groove portions 31 of the barrel 11. As described above, the soundproof tube 20 and the barrel 11 have the relation of Rout≤Bsur and Rsur≤Bout, and therefore the soundproof tube 20 can be stored in the barrel 11 with no interference between the projected portions 21 of the soundproof tube 20 and the inner periphery of the barrel 11.

The projected portions 21 of the soundproof tube 20 are projected in the longitudinal direction Lt, and the outer diameter Rout of the soundproof tube 20 including the projected portions 21 and the inner diameter Bout of the barrel 11 including the projected portions 30 satisfy the following relation: Bout<Rout. Therefore, after the soundproof tube 20 is inserted into the barrel 11, the soundproof tube 20 is rotated in a circumferential direction C. Consequently, the projected portions 21 and the projected portions 30 are in contact with each other at a plurality of positions in the barrel 11 (FIGS. 6 and 7).

Then, one end of the sheet 4 is fixed to the barrel 11. And then, the end portion, which is an end portion the retaining portion 13 is not inserted, of the barrel 11 is assembled with the rotation axis 12. Then, the rotation axis 12 is inserted into the recessed portion of the housing 2. The engagement tooth 13a of the retaining portion 13 is fixed by being engaged with the pawl portion 2a formed on the housing 2.

In the present embodiment, in addition to the effects of other embodiments, the following effects can be achieved. Because the tonneau cover device 1 does not have a shaft to pass through the spring 16, when inserting the soundproof tube 20, which covers the spring 16, into the barrel 11, friction resistance between the soundproof tube 20 and the barrel 11 can affect insertability. However, insertability can be improved by inserting the projected portions 21 into the groove portions 31 formed on the inner periphery of the barrel 11 when inserting the soundproof tube 20 into the barrel 11. Therefore, a member to reduce the friction resi-dence such as a nonwoven fabric is not required on the inner periphery of the barrel 11. Even if vibration is imparted to the tonneau cover device 1 after the tonneau cover device 1 is mounted on the vehicle compartment, the abnormal noise, which occurs when the soundproof tube 20 collides with the barrel 11, can be prevented because the soundproof tube 20 is, in the barrel 11, in contact with the barrel 11 via the projecting portions 30 and 21. Namely, assembling operation can be easily performed and the abnormal noise can be prevented after mounted on the vehicle compartment.

In addition, because the projected portions 30 and the projected portions 21 are in contact with each other, the spring 16 inserted into the barrel 11 and the soundproof tube 20 to cover the spring 16 are restricted not to rotate without press-bonding the barrel 11 with the retaining portion 14. Namely, the retaining portion 14 to which one end of the spring 16 is fixed is restricted not to rotate in the circum-ferential direction and can be retained on the barrel 11 to be slidable in the axial direction. Here, a length of the spring 16 in the axial direction is temporarily shortened when the sheet 4 is drawn out because the spring 16 is tightened, and the length is temporarily lengthened when the sheet 4 is wound because the spring 16 is loosened. If the retaining portion 14 is retained in the barrel 11 so as to be slidable in the axial direction, even when the length of the spring 16 is changed, the change is accepted by the slide of the retaining portion 14. Consequently, the spring 16 is prevented from waving, although it can be occurred when the end portion of the spring 16 cannot be slid. If the spring 16 is prevented from waving, the spring 16 is prevented from malfunctioning, the spring 16 is prevented from being accidentally engaged with the soundproof tube 20, and the abnormal noise is prevented from occurring.

(5) Variation Examples

Figure 8:
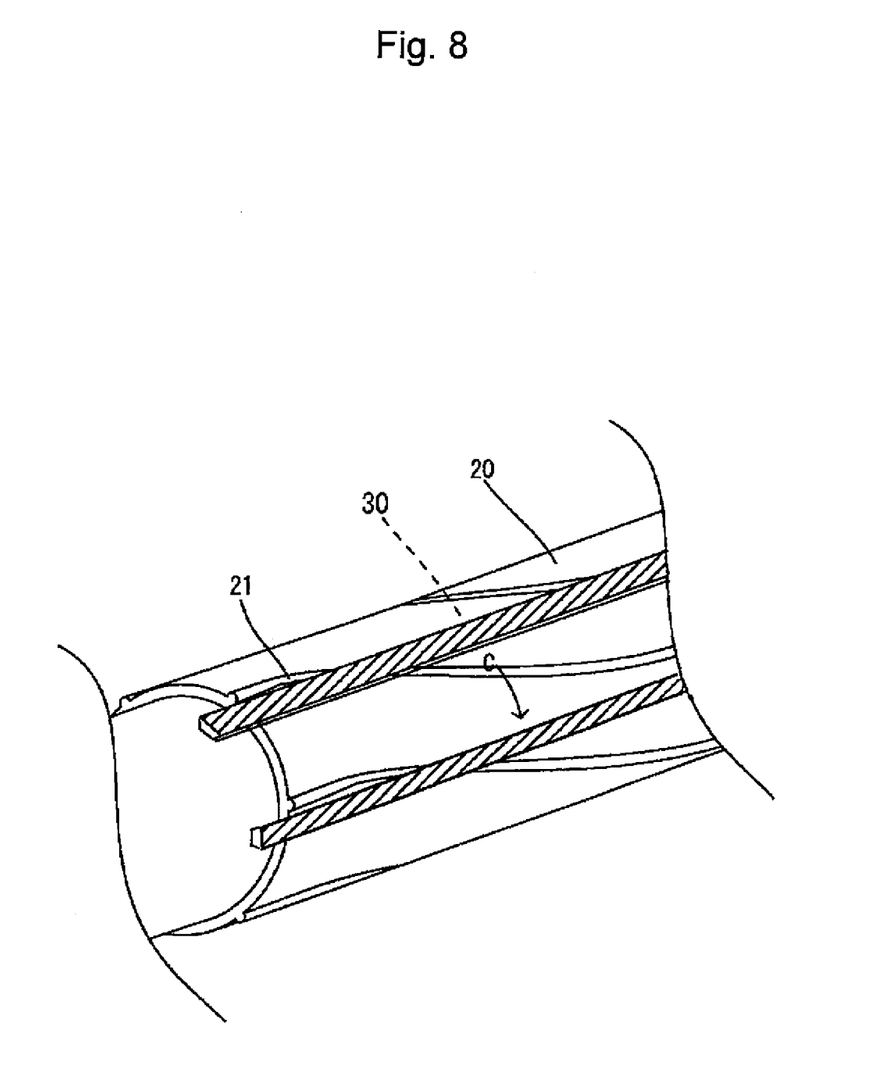
FIG. 8 is a perspective view showing the soundproof tube 20 stored inside the barrel 11.

FIG. 8 is a perspective view showing the soundproof tube 20 stored inside the barrel 11.

In the barrel 11 and the soundproof tube 20 concerning the third embodiment, the soundproof tube 20 can be stored in the barrel 11 with the soundproof tube 20 is twisted in the circumferential direction C. If the soundproof tube 20 are stored in the barrel 11 in a state that the projected portions 21 of the sound proof tube 20 is twisted in the circumfer-ential direction C, one of the projected portions 21 is in contact with a plurality of the projected portions 30 and therefore the contact between the barrel 11 and the sound-proof tube 20 can be stronger. Therefore, movement of the soundproof tube 20 in the barrel 11 is restrained and there-fore the abnormal noise can be prevented.

The twisting of the soundproof tube 20 can be generated by the following method. After the retaining portion 14 and the soundproof tube 20 are inserted into the barrel 11 in a state that the retaining portion 14 is fixed with the tip of the soundproof tube 20, the other end, which is an opposite end of the inserted end, of the soundproof tube 20 is rotated in the circumferential direction C. The retaining portion 14 is not rotated because the outer shape of the retaining portion 14 is engaged with the projected portions 30 of the barrel 11. Therefore, the other end of the soundproof tube 20 is rotated in a state that only the soundproof tube 20 is fixed at the tip, and twisting is generated on the whole length of the sound-proof tube 20. If the other end of the soundproof tube 20 is fixed with the retaining portion 13 in this state, the sound-proof tube 20 is retained in the barrel 11 with a twisted state.

Note that it is only an example to twist the soundproof tube 20 after it is inserted into the barrel 11. The soundproof tube 20 can be inserted into the barrel 11 twisting in the circumferential direction C.

(5) Other Application Examples

As a sheet winding apparatus, a tonneau cover device is used for explanation. However, it is only an example. The sheet winding apparatus can be a wind shade arranged on the vehicle compartment to shield a window part, for example.

A shape of the projected portions of the soundproof tube can be any shapes. For example, it can be a fin shape by increasing the projected amount of the projected portions. If the projected portions are formed to be a fin shape, the projected portions are easily deformed and therefore the abnormal noise can be prevented and assembling operation can be easily performed in higher level.

It is only an example that the projected portions are formed continuously in the longitudinal direction. Other shapes can be used.

For example, the projected portions can be formed not continuously, forming it partially in the longitudinal direc-tion.

In addition, even when forming the projected portions extending in the longitudinal direction, the projected por-tions can be formed linearly in the longitudinal direction, can be formed in a shape of polygonal line, and can be formed inclined at a predetermined angle to the longitudinal direction of the soundproof tube.

As explained above, in the present invention, abnormal noise can be prevented and assembling operation can be easily performed. Note that, this invention is not limited to the above-mentioned embodiments.

Although it is to those skilled in the art, the following are disclosed as the one embodiment of this invention.

Mutually substitutable members, configurations, etc. dis-closed in the embodiment can be used with their combina-tion altered appropriately.

Although not disclosed in the embodiment, members, configurations, etc. that belong to the known technology and can be substituted with the members, the configurations, etc. disclosed in the embodiment can be appropriately substi-tuted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

What is claimed is:

1. A sheet winding apparatus, comprising:
a sheet;
a winding barrel to which one end of the sheet is fixed and having a cylindrical shape;
a spring that is arranged in the winding barrel and gives a biasing force to the winding barrel in an opposite direction of drawing-out direction of the sheet; and
a soundproof tube that is arranged between an outer periphery of the spring and inside the winding barrel and has first projected portions projecting outward from an outer periphery of the soundproof tube.

2. The sheet winding apparatus according to claim 1, wherein
when an outer diameter of the soundproof tube including a tip of the first projected portions is specified as Rout, an outer diameter of the soundproof tube without including the first projected portions is specified as Rsur, an inner diameter of the soundproof tube is specified as Rin, and an inner diameter of the winding barrel is specified as Rb,
Rout, Rsur, Rin and Rb satisfy the following relations:

$Rsur < Rb$; and $Rb - Rout \leq Rout - Rin$.

3. The sheet winding apparatus according to claim 1, wherein
the winding barrel has second projected portions projecting inward from an inner periphery of the winding barrel, and
the first projected portions of the soundproof tube are in contact with the second projected portions.

4. The sheet winding apparatus according to claim 3, wherein
when an outer diameter of the soundproof tube including a tip of the first projected portions is specified as Rout, an outer diameter of the soundproof tube without including the first projected portions is specified as Rsur, an inner diameter of the winding barrel including a tip of the second projected portions is specified as Bout, and an inner diameter of the winding barrel without including the second projected portions is specified as Bsur,
Rout, Rsur, Bout and Bsur satisfy the following relations:

$Rout \leq Bsur$;

$Rsur \leq Bout$; and $Bout < Rout$.

5. The sheet winding apparatus according to claim 1, wherein
the soundproof tube has third projected portions projecting inward from an inner periphery of the soundproof tube, and
the third projected portions and the first projected portions are formed so that the projected portions projecting outward and the projected portions projecting inwards are not projected from a same position.

6. The sheet winding apparatus according to claim 1, wherein
a hardness of the soundproof tube is between 60 and 80 when measured by shore A hardness.

* * * * *